No. 690,031.  
Patented Dec. 31, 1901.  
H. PARKER.  
COMPOSITE PERFORATED MATERIAL.  
(Application filed Mar. 27, 1901.)  
(No Model.)  
2 Sheets—Sheet 1.

Witnesses  
C. F. Kilgore  
F. M. Bragg

Inventor  
Howard Parker  
By Simons & Hart  
Attorneys

No. 690,031. Patented Dec. 31, 1901.
H. PARKER.
COMPOSITE PERFORATED MATERIAL.
(Application filed Mar. 27, 1901.)
(No Model.) 2 Sheets—Sheet 2.

Witnesses
C. F. Kilgore
F. M. Bragg

Inventor
Howard Parker
By Simonds & Hart
Attorneys

UNITED STATES PATENT OFFICE.

HOWARD PARKER, OF BELLOWS FALLS, VERMONT.

COMPOSITE PERFORATED MATERIAL.

SPECIFICATION forming part of Letters Patent No. 690,031, dated December 31, 1901.

Application filed March 27, 1901. Serial No. 53,080. (No specimens.)

*To all whom it may concern:*

Be it known that I, HOWARD PARKER, a citizen of the United States of America, residing at Bellows Falls, in the county of Windham and State of Vermont, have invented a certain new and useful Improvement in Composite Perforated Material, of which the following is a description, reference being had to the accompanying drawings, wherein—

Figure 1:
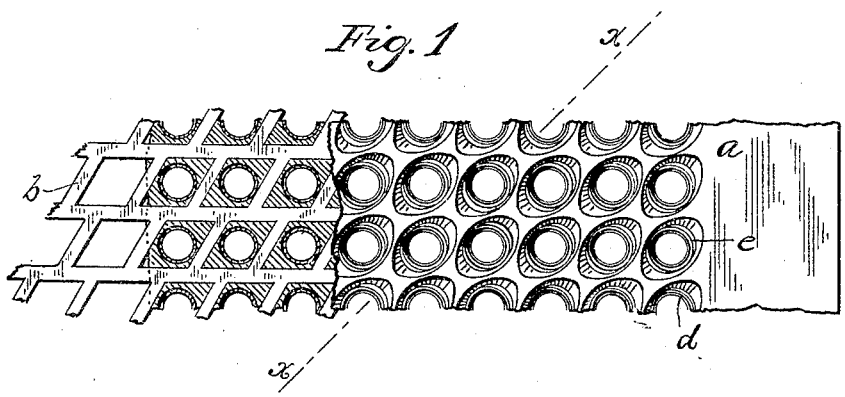
Figure 2:
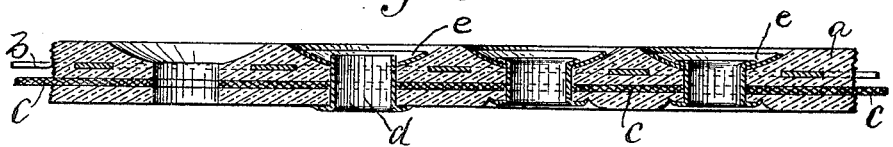
Figure 3:
Figure 3:
Figure 4:
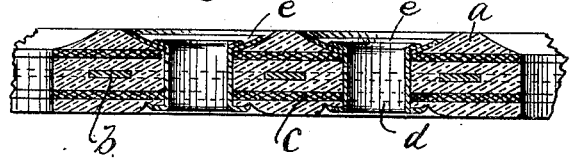
Figure 5:
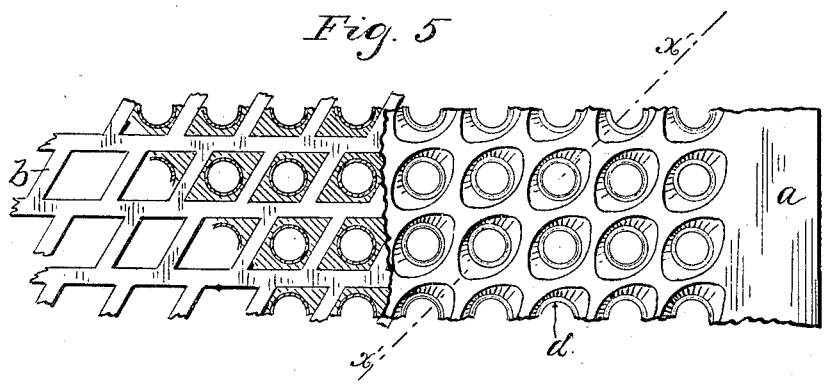
Figure 6:
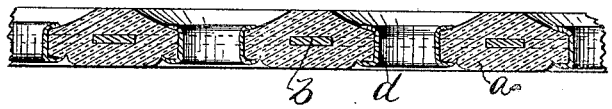
Figure 7:
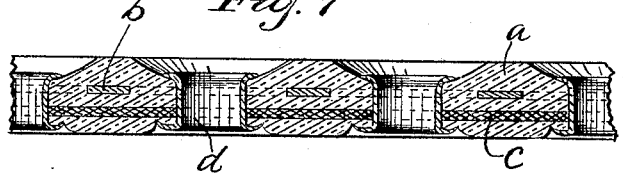
Figure 8:
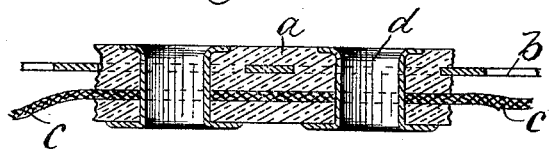

Figure 1 is a plan view of composite perforated material embodying said improvement, a part being shown in section. Fig. 2 is a view of what is shown in Fig. 1, on an enlarged scale, in vertical section on the plane $x\ x$ of Fig. 1. Fig. 3 is a view of the dished collar hereinafter referred to. It also shows the eyelet, which is hereinafter referred to, before it is fastened in place. Fig. 4 is a view similar to Fig. 2, a modification wherein the composite material embraces two strips of textile fabric. Fig. 5 is a view similar to Fig. 1, showing a modification in which the dished collar already referred to is omitted. Fig. 6 is a view of what is shown in Fig. 5 in vertical section on the plane $x'\ x'$ of Fig. 5. Fig. 7 is a view similar to Fig. 6 with the exception that the composite material embraces textile fabric not shown in Fig. 6. Fig. 8 is a sectional view of a modification in which the indentations in the soft rubber are omitted.

The object of the improvement is the production of composite material in the form of a plate, belt, cylinder, or in any other desired and useful form having certain features of novelty and advantage. One function for which a plate of such composite material is of special utility is for supporting a "Fourdrinier wire." These wires are extremely expensive, and when used in connection with the ordinary suction-boxes they are easily torn, so that their life is extremely short. It is important, therefore, for the economical operation of a paper-making machine that some agency be interposed between this wire and the suction-box to relieve the wire of this hard wear, and the belt which is herein shown and described is particularly adaptable for this purpose.

In the accompanying drawings the letter $a$ denotes "soft rubber" or what is generally known by that name. Of course it may be a rubber compound.

The letter $b$ denotes a plate of perforated metal.

The letter $c$ denotes a sheet of textile fabric, preferably the thing generally called "canvas."

In the process of manufacture the plate of perforated metal and the sheet of textile fabric are molded into the soft rubber, so that the rubber coats both sides of the perforated metal plate and the textile fabric. There are holes through the rubber within the perforations of the metal plate which also pierce the sheet of textile fabric when that is used. In Fig. 8 a construction is shown where these holes extend practically from one surface to the other of the soft rubber; but by preference these holes at one end terminate in indentations in the rubber, such as are illustrated in Figs. 1, 2, 4, 5, 6, and 7.

The letter $d$ denotes eyelets which are located in the holes through the rubber. They are in all cases headed at both ends. By preference there is a dished collar $e$ lying in the said indentations when they are present, and one end of the eyelet is headed down thereupon. In Fig. 2 there is shown at the left one of the holes through the rubber and an indentation at one terminal thereof free from the eyelet and the dished collar. Next to it the eyelet and dished collar are shown in place with one end of the eyelet unheaded. In the other two holes through the rubber the eyelet and collar are shown in place with one end of the eyelet headed upon the collar.

I claim as my improvement—

1. In combination; the plate of perforated metal; the sheet of soft rubber coating both sides of said plate and having holes through the same within the perforations of said plate; and the eyelets within said holes headed at both ends, said headed ends of said eyelets lying below the surface of the rubber; all substantially as described and for the purposes set forth.

2. In combination; the plate of perforated metal; the sheet of textile fabric non-contacting said plate; the sheet of soft rubber coating both sides of said plate and said fabric and having holes through said rubber within the perforations of said plate; and the eyelets within said holes headed at both ends; all substantially as described and for the purposes set forth.

3. In combination; the plate of perforated metal; the sheet of soft rubber coating both sides of said plate and having holes through the same, within the perforations of said plate, which at one end terminate in indentations in said rubber; and the eyelets in said holes headed at both ends; all substantially as described and for the purposes set forth.

4. In combination; the plate of perforated metal; the sheet of textile fabric non-contacting said plate; the sheet of rubber coating both sides of said plate and said fabric and having holes through the same, which at one end, terminate in indentations in said plate; and the eyelets in said holes headed at both ends; all substantially as described and for the purposes set forth.

5. In combination; the plate of perforated metal; the sheet of rubber coating both sides of said plate, with holes through the same within the perforations of said plate which, at one end, terminate in indentations in said rubber; the dished collars in said indentations; and the eyelets in said holes headed at both ends, all substantially as described and for the purposes set forth.

6. In combination; the plate of perforated metal; the sheet of textile fabric non-contacting said plate; the sheet of soft rubber coating both sides of said plate and said fabric and having holes through the same within the perforations of said plate which terminate, at one end, in said indentations in said rubber; the dished collar in said indentations; and the eyelets in said holes headed at both ends; all substantially as described and for the purposes set forth.

HOWARD PARKER.

Witnesses:
BERTHA I. CAPRON,
CHARLES H. ROBB.